United States Patent
Buck-Gengler

[19]

[11] Patent Number: 6,125,437
[45] Date of Patent: Sep. 26, 2000

[54] VIRTUAL LINEAR FRAME BUFFER ADDRESSING METHOD AND APPARATUS

[75] Inventor: Joel D. Buck-Gengler, Longmont, Colo.

[73] Assignee: Hewlett-Packard Company, Palo Alto, Calif.

[21] Appl. No.: 09/035,447

[22] Filed: Mar. 5, 1998

[51] Int. Cl.[7] ............................. G06F 12/06; G06F 12/10; G09G 5/36

[52] U.S. Cl. .......................... 711/209; 711/153; 711/208; 711/220; 711/202; 345/515; 345/517; 345/512

[58] Field of Search .................................. 711/153, 173, 711/202, 209, 220, 208; 345/507, 515, 516, 517, 512, 196

[56] References Cited

U.S. PATENT DOCUMENTS

| | | | |
|---|---|---|---|
| 5,293,593 | 3/1994 | Hodge et al. | 711/202 |
| 5,388,200 | 2/1995 | McDonald et al. | 345/340 |
| 5,745,739 | 4/1998 | Wang et al. | 711/203 |
| 5,936,616 | 8/1999 | Torborg, Jr. et al. | 345/202 |
| 5,949,429 | 9/1999 | Bonneau | 345/433 |
| 5,990,912 | 11/1999 | Swanson | 345/516 |
| 5,999,743 | 12/1999 | Horan et al. | 710/56 |

*Primary Examiner*—Glenn Gossage

[57] ABSTRACT

A virtual linear frame buffer addressing method and apparatus efficiently convert a linear address supplied by an application programming (API) into an X, Y address used in a rectangular memory addressing arrangement. The virtual linear frame buffer addressing logic allows rectangular memory addressing to coexist in an environment that requires the use of linear memory addressing by creating a table of address ranges, byte stride values and physical address offset descriptors. The address ranges and byte stride values are associated with particular sections of frame buffer memory. An offset descriptor is associated with each section of physical memory. The address ranges, byte stride values and offset descriptors are placed into a table. When a linear address is received from an API, the address range is determined. The lower bound of the address range is the base address. The base address is subtracted from the linear address resulting in a local linear address. Based upon the address range, a particular byte stride value is selected from the table and used to divide the local address resulting in an X, Y location corresponding to the linear address. The X, Y location and the offset descriptor are supplied to a memory controller, such as a graphics memory controller, which then determines the physical address corresponding to the linear address.

11 Claims, 9 Drawing Sheets

VIRTUAL LINEAR FRAME BUFFER ADDRESSING METHOD AND APPARATUS

FIELD OF THE INVENTION

The present invention relates generally to computer graphics systems, and, more particularly, to a method and apparatus for virtual linear frame buffer addressing.

BACKGROUND OF THE INVENTION

Computer graphics systems commonly are used for displaying graphical representations of objects on a two dimensional computer display screen. Current computer graphics systems can provide highly detailed representations and are used in a variety of applications.

In typical computer graphics systems, a certain amount of memory is allocated to the graphics display. That available memory, for example frame buffer memory, is partitioned into a series of sections depending upon the display requirement, such as, for example, 640×480 bytes or 800× 600 bytes. In this example, the display configuration can include a display buffer, a Z (Depth) buffer, a composition buffer, a video buffer, and a plurality of texture buffers.

The aforementioned display systems generally provide a fixed amount of frame buffer memory for the display, as mentioned above, however, they allot differing amounts of memory for different buffers, depending on the display configuration desired. In the simplest implementation, frame buffer memory is typically accessed in a linear fashion, whereby the memory is partitioned into a linear stream with each memory location, or byte, treated as equivalent to any other.

Figure 1:
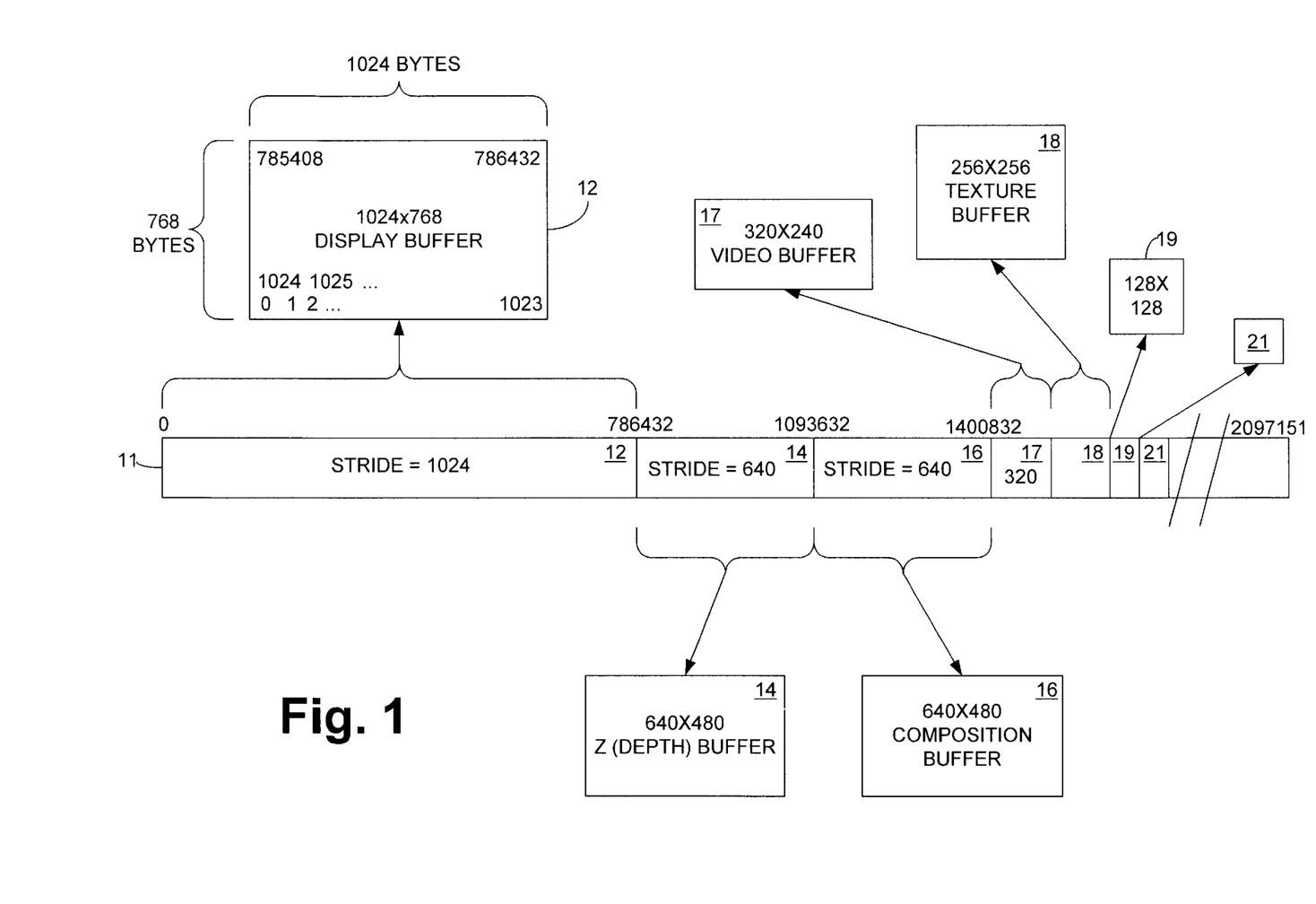
FIG. 1 is a schematic view illustrating a 2 megabyte (MB) section of memory partitioned into sections.

To illustrate, refer now to FIG. 1, which illustratively shows a 2 megabyte (MB) section of memory 11 partitioned into sections. The first 786 Kbytes of memory section 11 are arranged in a 1024×768 byte matrix allocated to a display buffer 12. Next a 640×480 byte section of memory 11 is depicted as allocated to a Z buffer 14 and represented as 308 Kbytes in memory 11. Next, another 640×480 byte section represented as 308 Kbytes is allocated to a composition buffer 16. Similarly, video buffer 17, and texture buffers 18, 19, and 21 are allocated sections of memory 11.

In the memory section 11 depicted in FIG. 1, each buffer, i.e., display buffer 12, Z buffer 14, composition buffer 16, etc., has a particular byte stride (BS) associated therewith. For example, the byte stride of display buffer 12 is 1024 while the byte stride of composition buffer 16 is 640.

Referring to display buffer 12, the first 1024 bytes of memory make up the first line of display buffer 12. The 1025th byte of display buffer 12 begins the second line, and so on, with each byte of memory considered equivalent to any other. Section 12 is considered to have a stride of 1024 bytes. To define a particular memory location, i.e., to transform an x,y address to a linear address (LA), the following formula can be used. X,Y→Linear Address (LA)=y•Byte Stride (BS)+x+Base Address (BA).

The base address is the starting location for the particular section of allocated memory. The base address for section 12 is "0", while the base address for section 16 is 1093632, that is 786432+307200=1093632. For example, section 16 is a total of 307200 bytes with a dimension of 640 bytes×480 bytes. The "x" dimension is 640 and the "y" dimension is 480. Assuming the memory location desired to be accessed is pixel (3,2) corresponding to "x" dimension 3 and "y" dimension 2, plugging the numbers into the formula we have LA=2("y" dimension)•640 (byte stride)+3("x" dimension)+ 1093632(Base Address)=1094915. Therefore, an x,y location of 3,2 translates into a linear address of 1094915, meaning that byte 1094915 is the byte that would be addressed if one desired to reach the particular byte represented by pixel 3,2 in section 16.

In actuality however, each byte of memory is not equivalent. Because of the underlying memory architecture, it is usually the case that some memory accesses are less costly than others. The underlying memory is accessed using a (row, column) address, and the address is specified on a multiplexed address bus. If two acceses have the same row address, it is not necessary to specify the row address for the second access, it having been supplied for the first access. If the second access has a different row address, then both the row and column address must be specified.

In computer graphics, there is a high degree of 2-dimensional locality to the accesses to the memory. That is, given a first access, the next access is likely to be dose in either the X or Y dimension.

Designers of high performance computer graphics devices take advantage of these two facts when designing memory controllers. They will ensure that the memory is organized in such a way that subsequent accesses in both the X and Y direction will have a high likelihood of having the same row address (same page), thereby allowing subsequent accesses at a lower cost.

Figure 2A:
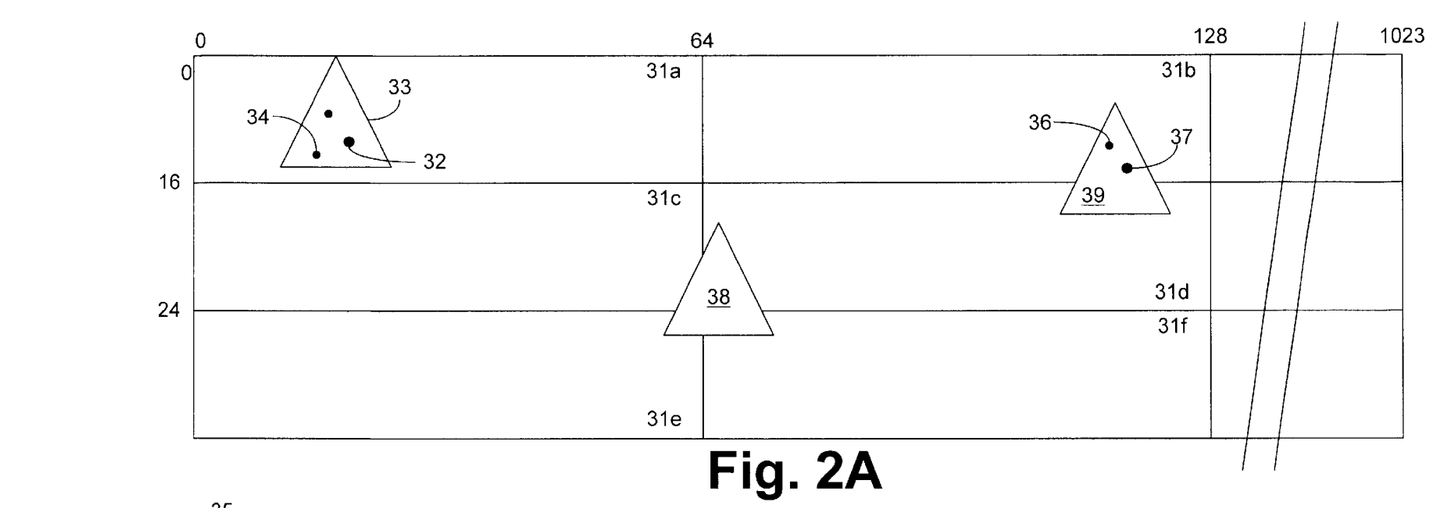
FIG. 2A is a schematic view illustrating the position of primitives and pixels drawn to a page of memory.

Referring now to FIG. 2A, the aforementioned concept is illustrated. FIG. 2A is a schematic view illustrating the position of primitives and pixels with respect to the memory organization discussed above. When graphical images are displayed on a screen, the building blocks of all images are called primitives. Primitives are typically triangular or square in shape.

Primitive 33 is shown as residing completely within page 31a, which represents a single page of memory. There is a high probability that successive pixels, i.e., pixel 34, drawn after first pixel 32, will fall on the same page of memory (31a), thereby requiring less system resources to draw pixel 34 when memory is arranged and accessed as in FIG. 2B.

Primitive 39 is depicted as overlapping pages 31b and 31d. Assume that pixel 37 is drawn first. Even as primitive 39 overlaps pages 31b and 31d of memory, there is still a high probability that a successive pixel, 36, will be drawn to the same page, 31b, as pixel 37.

Figure 2B:
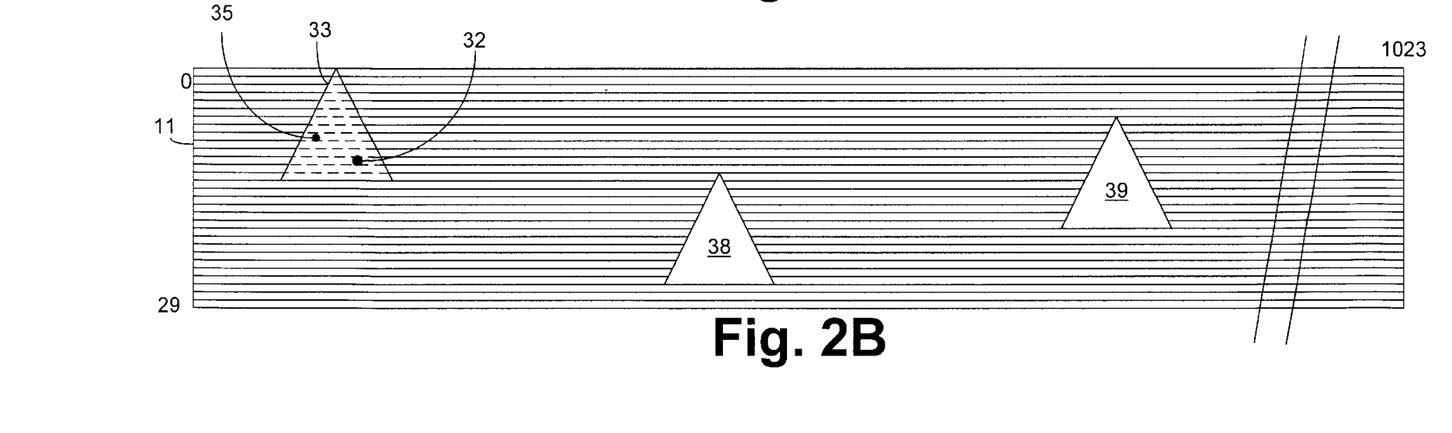
FIG. 2B is a schematic view illustrating the position of primitives and pixels drawn to the pages of the memory of FIG. 1.

Referring now to FIG. 2B, shown are the position of primitives and pixels on multiple pages of the memory of FIG. 1. FIG. 2B illustrates 29 rows, or pages of memory 11. Each page of memory 11 contains 1024 bytes of memory organized linearly. Primitives 33, 38 and 39 are shown to illustrate the concept of high resource mapping. Each primitive is made up of a plurality of pixels. Assuming that pixel 32 in primitive 33 is drawn first, the next pixel drawn (35) is likely to be drawn to a different page, or line, of memory when the memory is linearly organized as in FIG. 2B. In FIG. 2B, because the memory is organized linearly, a successive pixel drawn to each primitive is likely to be on a different page, thus requiring increased system resources to draw.

The high performance memory access mechanism as depicted in FIG. 2A, however, requires that a graphics memory controller know the (X, Y) address of the particular location in memory desired to be accessed. The linear access mechanism described earlier provides only a single linear address, not an (X, Y) address.

This arrangement would not be a problem except that industry personal computer (PC) standards (such as DIRECT X® application programming interface (API)), which is a registered trademark of Microsoft Corporation of Redmond, Wash. require the use of a memory access mechanism that is linear byte based. That is, the PC market requires a base address and a byte stride value in order to access memory. The base address is the location in memory that denotes the start of a particular section and the byte stride is the number of bytes arranged linearly, or in the x direction, in a particular section of memory.

One way to comply is to assign a single stride to the entire frame buffer memory and arrange the pages in rectangular fashion.

Figure 3:
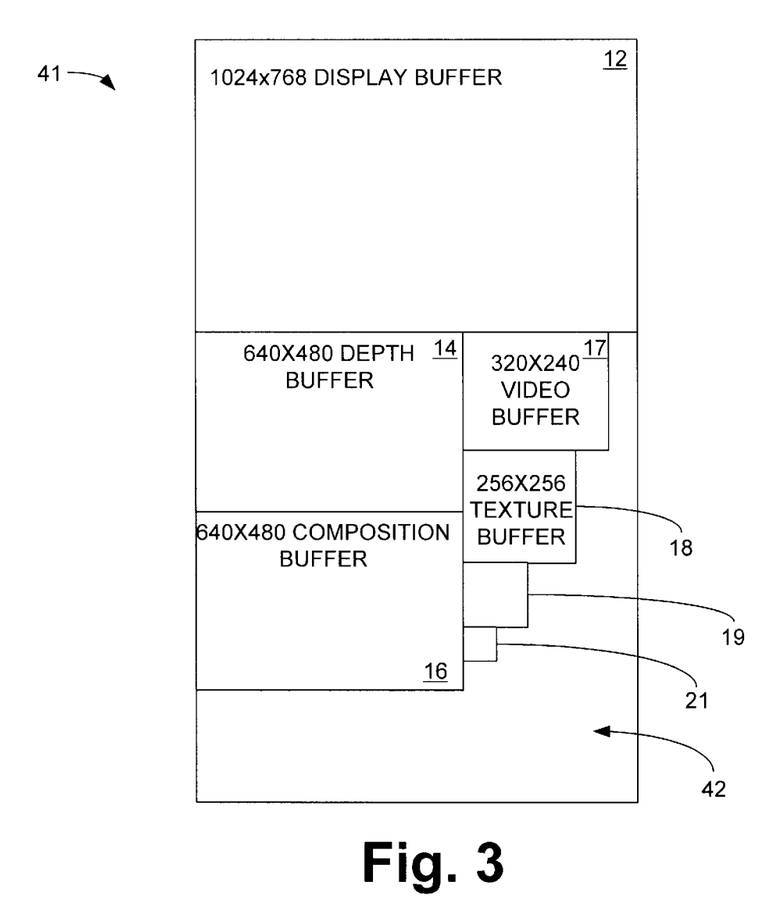
FIG. 3 is a block diagram of the buffers of FIG. 1 arranged in a rectangular 2-dimensional array.

Referring now to FIG. 3, shown are the buffers of FIG. 1 arranged in a rectangular 2-dimensional array. Rectangular memory section 41 illustrates a compromise solution by treating the whole memory as one large 2D array 41 with a single byte stride of 1024 bytes. With this solution, the pages of memory can be preconfigured to take advantage of the 2D locality of rendered primitives. Flexibility requirements are met in that any rectangle (e.g., display buffer 12, Z (depth) buffer 14, composition buffer 16, etc.) can be carved out of the single large rectangle to be used for any purpose. However, the disadvantage to this solution is that some areas, or sections of the memory can become unusable. These unusable sections are illustrated as area 42. For example, there may be physically enough memory in area 42 to allocate an additional buffer, however, the available memory locations are scattered throughout the memory and cannot be encompassed in a rectangle of the desired size with any amount of reorganization. Furthermore, this arrangement sacrifices the linear allocation required by an API such as DIRECT X® API.

Figure 4A:
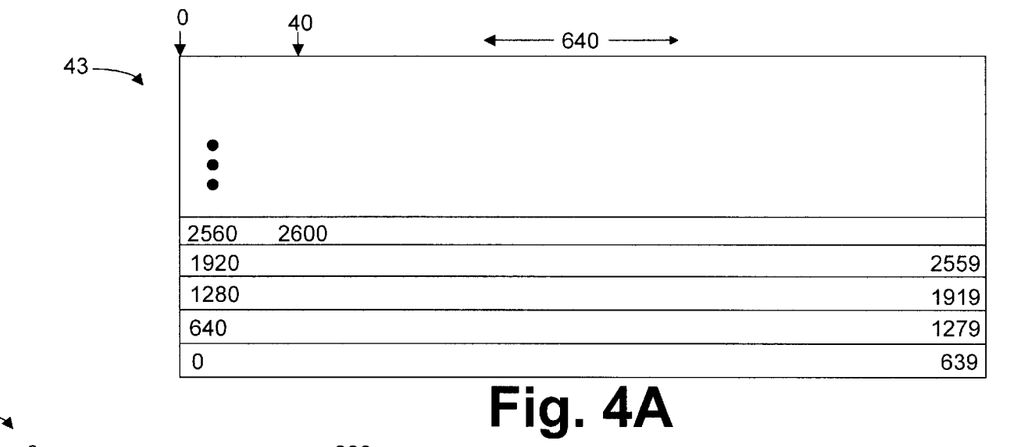
FIG. 4A is a schematic view of a 640 byte wide buffer having a byte stride of 640.
Figure 4B:
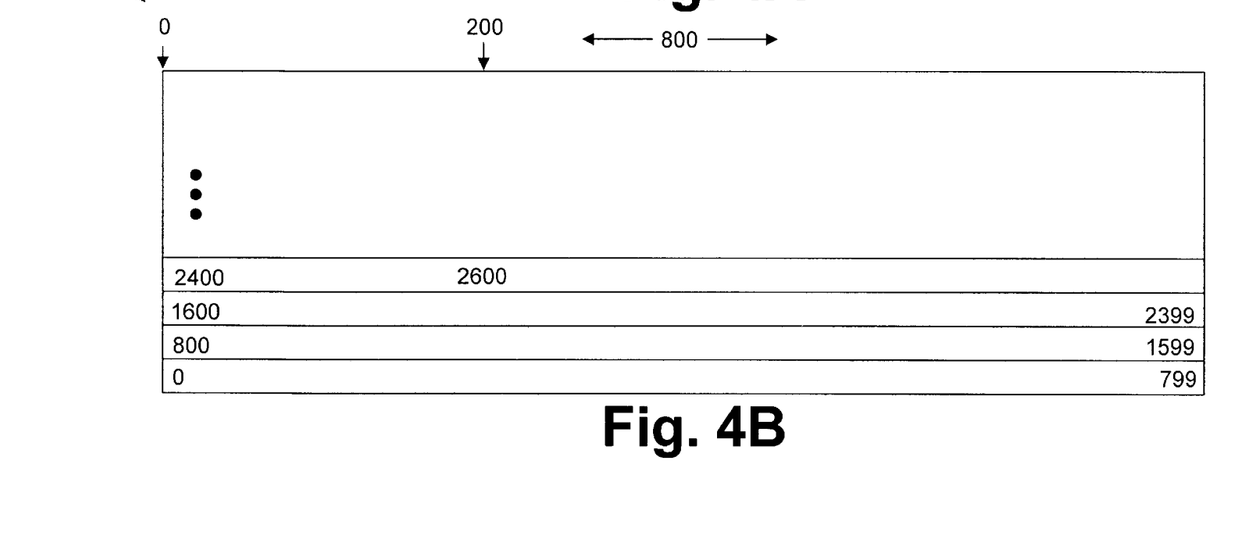
FIG. 4B is a schematic view of an 800 byte wide buffer having a byte stride of 800.

Referring now to FIGS. 4A and 4B, shown are schematic views of a 640 byte wide buffer 43 and an 800 byte wide buffer 47. FIGS. 4A and 4B illustrate the concept that a linear address of a particular memory location will correspond to a different line and column location in buffers having different byte stride values. Spefically, as shown in FIG. 4A, linear address location 2600 will correspond to line 4 column 40 in the 640 byte wide (byte stride=640) buffer 43, while linear address 2600 will correspond to line 3 column 200 in the 840 byte wide (byte stride=800) buffer 47 shown in FIG. 4B.

Because the API requires that the appearance of linear access to memory be maintained, it would be desirable to provide the appearance of linear memory addressing while taking advantage of the 2-dimensionality of graphics rendering systems using rectangular memory addressing.

SUMMARY OF THE INVENTION

The invention provides an improved method and apparatus for virtual linear frame buffer addressing. Although not limited to these particular applications, the method and apparatus are particularly suited for the virtual linear addressing of frame buffer memory for graphics display systems.

The present invention can be conceptualized as a method for addressing a frame buffer in a linear fashion, comprising the following steps. First, a section of address space is partitioned into a plurality of sections, each of the sections having a particular byte stride value and address range associated therewith. The address range has a lower bound known as a base address and the address range has a section of physical memory associated therewith. A physical address offset descriptor is associated with each section of physical memory Each particular byte stride value, address range, and physical address offset descriptor is associated with a particular address range of the memory and each is placed into a table. Upon determining the address range of a particular linear address of a byte, the appropriate byte stride value, address range, and physical address offset descriptor are selected from the table by comparing the linear address with each section of address space in order to determine an address range associated with the particular linear address.

Next the base address is subtracted from the particular linear address resulting in a local linear address. Next an X, Y location is calculated based upon the local linear address and the byte stride value. Finally, the X, Y location and the physical address offset descriptor are supplied to a graphics memory controller, which determines the location in physical memory corresponding to the original linear address.

In addition, the address space allocated is virtual in nature in that a particular virtual frame buffer is given a physical memory location.

In architecture, when employed in connection with a graphical display system, the virtual linear frame buffer addressing logic is implemented as follows. First, logic configured to determine an address range corresponding to a particular linear address of a byte in memory is employed. The address range has a lower bound known as a base address and a physical memory section is associated therewith. Then, logic configured to associate a byte stride value and the base address with the address range is employed. Next, logic is employed which associates a physical address offset descriptor with each section of physical memory. Next, logic subtracts the base address from the particular linear address which results in a local linear address. The local linear address is divided by the byte stride value resulting in an X and Y address. Lastly, the X and Y address and the physical address offset descriptor are supplied to a graphics memory controller, which calculates the physical address associated with the particular linear address. The byte stride value, address range and physical address offset descriptor are selected from a table. The logic that determines the address range can be for example, a bank of comparators, or a single comparator and a loop counter.

The invention has numerous advantages, a few of which are delineated, hereafter, as merely examples.

An advantage of the invention is that it provides the appearance of linear frame buffer addressing while allowing the retention of rectangular memory mapping.

Another advantage of the present invention is that it complies with the API requirement for frame buffer addressing.

Another advantage of the invention is that it allows for accessing more physical memory than is allowed for in terms of address space.

Another advantage of the invention is that it can be implemented in hardware, software, or a combination thereof. When implemented in software, it can be stored, utilized, and transported while residing on any computer readable medium.

Another advantage of the invention is that it is simple in design and easily implemented on a mass scale for commercial production.

Other features and advantages of the invention will become apparent to one with skill in the art upon examination of the following drawings and detailed description. These additional features and advantages are intended to be included herein within the scope of the present invention.

BRIEF DESCRIPTION OF THE DRAWINGS

The present invention, as defined in the claims, can be better understood with reference to the following drawings.

DETAILED DESCRIPTION OF THE PREFERRED EMBODIMENT

The present invention can be implemented in software, hardware or a combination thereof In the preferred embodiment, the elements of the present invention are implemented in hardware, which is controlled by software that is stored in a memory. The foregoing software can be stored on any computer readable medium for transport or for use by or in connection with any suitable computer related system or method. In the context of this document, a computer readable medium is an electronic, magnetic, optical, or other physical device or means that can contain or store a computer program for use by or in connection with a computer related system or method.

Figure 5:
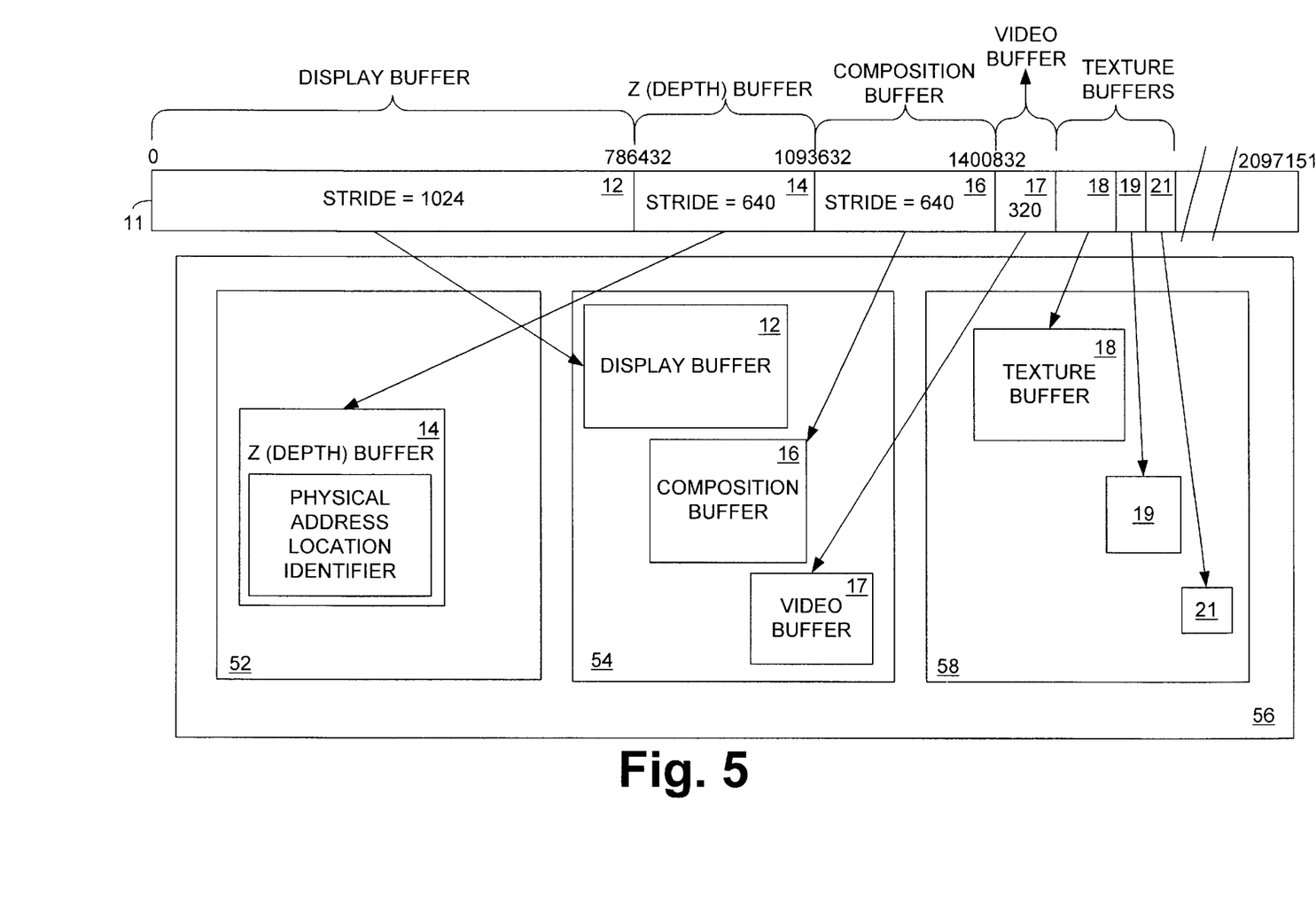
FIG. 5 is a schematic view illustrating virtual frame buffer memory assignment.

Referring now to FIG. 5 shown is a schematic view illustrating virtual frame buffer memory assignment. Virtual linear address space 11 illustratively includes display buffer 12, Z (depth) buffer 14, composition buffer 16, video buffer 17, and texture buffers 18, 19 and 21. Many other buffer types are possible. However, for simplicity, only seven buffer types are illustrated herein. The virtual addressing allows, for example, display buffer 12 to be associated with section 54 of physical memory 56, the Z buffer 14 to correspond to section 52, the composition buffer 16 to be associated with section 54 and so on. This illustrates that virtual linear address space 11 is maintained intact, while in actuality, the memory is mapped to varying locations in physical memory 56. The size of physical memory 56 may be larger than the amount of virtual address space. Contained within each buffer in physical memory 56 is a descriptor known as the physical address offset descriptor. This descriptor allows the virtual linear frame buffer addressing logic of the present invention to correlate a location in physical memory with the beginning location of a particular buffer.

Referring back to FIGS. 2A and 2B, in order to capitalize on the 2-dimensionality of graphics rendering allowed by arranging the frame buffer memory as depicted in FIG. 2A, the particular X and Y locations of a pixel are determined from a given linear address.

In order for the API to compute a memory location address, the API is given a base address and a byte stride. The API computes the linear address as follows. [x, y]→LA=BA+y*BS+x, where LA is the linear address, BA is the base address, and BS is the byte stride. The API delivers the linear address to the logic of the present invention. However, in order to successfully determine the byte address given the linear address, because of the rectangular memory mapping, the X and Y address must be determined.

Because the block of memory is 2 dimensional and rectangular, the X and Y location of a particular block of memory will be different depending upon the byte stride of a particular section of memory as depicted with reference to FIGS. 4A and 4B. For example, if you have a 640 byte wide section of memory 43 as depicted in FIG. 4A, the location of a particular byte of memory will be different than if you have an 800 byte wide section 47 as depicted in FIG. 4B. For example, the first byte of memory on the second row of section 43 is byte 640, while the first byte of memory on the second row of section 47 is byte 800. The virtual linear frame buffer addressing logic allows the memory to be efficiently mapped by allowing for the use of different frame buffer sizes, e.g., 640 wide and 800 wide, in the same program. Note that 640 and 800 byte wide sections of memory are for illustrative purposes only. Any width sections of memory can be addressed using the concepts of the virtual linear frame buffer addressing logic of the present invention.

If, for example, all memory were the same stride, say 640 bytes wide, then each linear address would only need to be divided by 640. However, it is desirable to permit different size buffer types. Referring back to FIG. 1 and to FIG. 5, illustrated is the concept of the division of virtual linear address space 11 into sections, each section having a different byte stride. For illustrative purposes, physical memory sections 52, 54 and 58 are the same as frame buffer memory 74 to be discussed with respect to FIG. 6. Virtual linear address space 11 is divided into different regions of virtual memory, each region forming a buffer and each region having a different byte stride. Display buffer 12 has a byte stride of 1024, Z buffer 14 has a byte stride of 640, composition buffer 16 has a byte stride of 640 and video buffer 17 has a byte stride of 320. For simplicity, only four buffers are illustrated. However, many other buffers having many byte stride values are possible. It is desirable to allow buffers having varying byte strides to coexist within virtual linear address space 11 such that many buffer types may be provided. The aforementioned byte stride values are entered into the virtual linear address (VLA) table (to be discussed with respect to FIG. 6), the values corresponding to the regions of frame buffer memory 74. This allows access to a plurality of different sized sections of memory within a frame buffer, each section capable of being configured to a plurality of buffer types.

As an example, given a linear address, the X and Y address is determined as follows:

X=(LA−BA)%BS

Y=(LA−BA)÷BS, where % is a modulo operator denoting remainder. For example, using the 640 byte wide section of memory 16, and given a linear address of 1094915 and a base address of 1093632:

X=(1094915−1093632)÷640=2
Y=(1094915−1093632)%640=3
From this it can be seen how the linear address was arrived at. This means that the API desired to access byte 2, 3 and derived the following.
LA=BA+Y*BS+X
LA=1093632+2*640+3
LA=1093632+1280+3
LA=1094915.
The above computation tells us that linear address 1094915 corresponds to X, Y address 2,3 for memory section 16 in FIG. 1.

Figure 6:
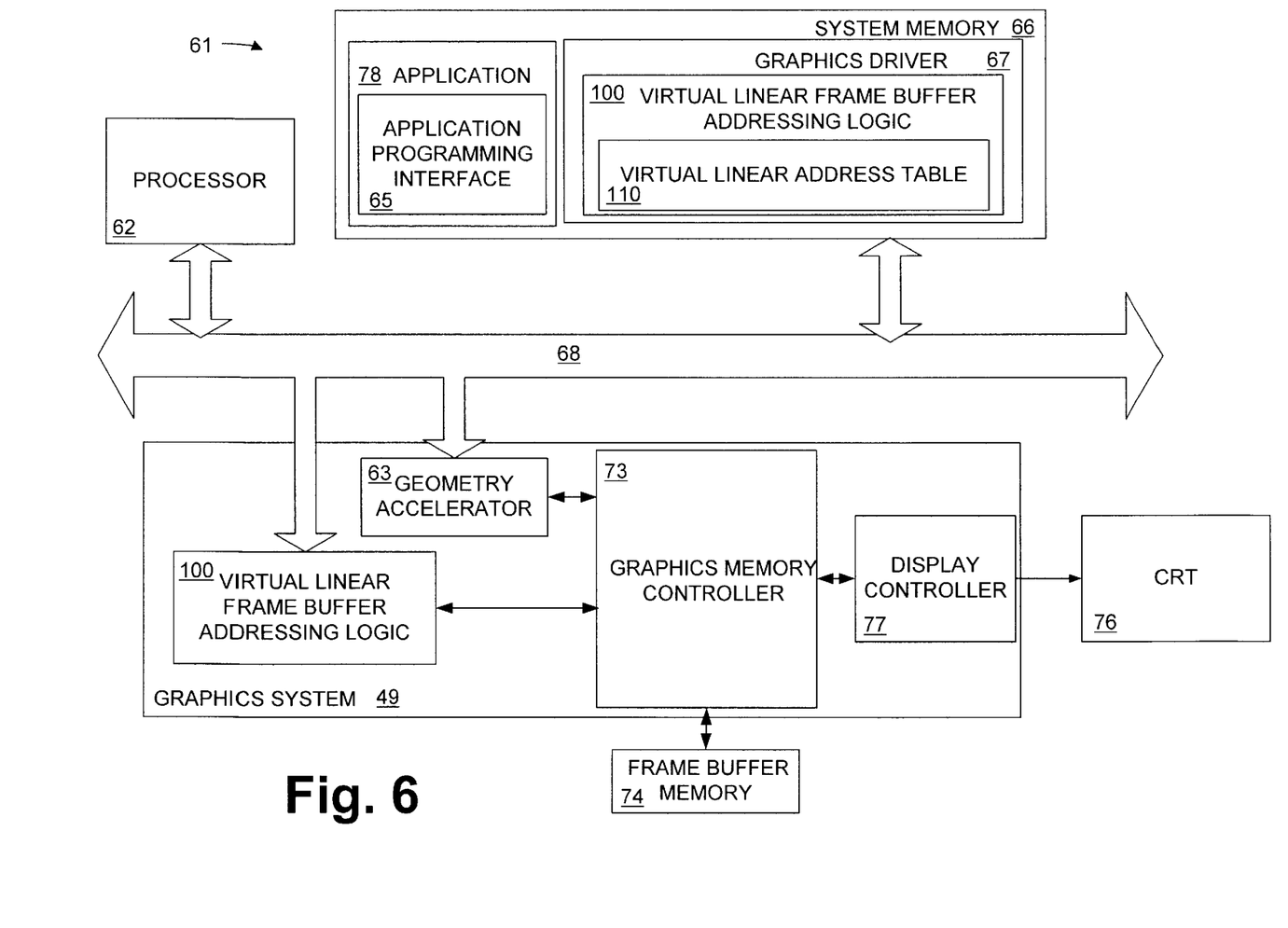
FIG. 6 is a block diagram of a graphical processor system including the virtual linear frame buffer addressing logic of the present invention.

Referring now to FIG. 6, shown is graphics display system 61. Graphics display system 61 contains components that are known in the art. Included is processor 62, which communicates with graphics system 49 and system memory 66 over access bus 68. Graphics system 49 includes geometry accelerator 63, which communicates with graphics memory controller 73 and access bus 68. Geometry accelerator 63 creates and rasterizes primitives and provides data.

Also included in graphics system 49 is virtual linear frame buffer addressing logic 100 of the present invention, which communicates with access bus 68 and graphics memory controller 73. Frame buffer memory 74 communicates with graphics memory controller 73.

Frame buffer memory 74 can be configured to provide a plurality of display configurations depending upon the allocation of its memory. Display controller 77 communicates with graphics memory controller 73 and CRT 76 in order to display information to a user by generating a graphical display image on CRT 76. Within system memory 66 resides graphics driver 67. Graphics driver 67 contains virtual linear frame buffer addressing logic 100, which further includes virtual linear address (VLA) table 110, and is configured to address portions of frame buffer memory 74.

Virtual linear address table 110 is developed by placing the byte stride value, address range, and physical address offset descriptor therein. In the preferred embodiment, the present invention is a combination of hardware elements being driven by software. To this end, virtual linear frame buffer addressing logic 100 is shown as residing in system memory 66 and in graphics system 49. Virtual linear frame buffer addressing logic 100 configures and drives hardware to be disclosed hereinafter, thereby working with the graphics memory controller 73 to address frame buffer memory 74.

This task is accomplished by taking the linear address of a particular location of memory, the linear address being supplied by application programming interface 65, which is contained within application 78, and deriving the X and Y address from the linear address by comparing the linear address with a section of address space in order to determine an address range. Depending upon the address range of a particular linear address corresponding to the particular section of memory (i.e., 12, 14, 16. . .of FIG. 1) in which the linear address resides, a base address value and a byte stride value are selected from the VLA table 110. The particular linear address is associated with the particular base address value and byte stride value taken from VLA table 110. The aforementioned will be described in detail with reference to FIG. 7.

Furthermore, frame buffer memory 74 can be a segment of system memory 66. However, for illustrative purposes is shown as an independent element.

Figure 7:
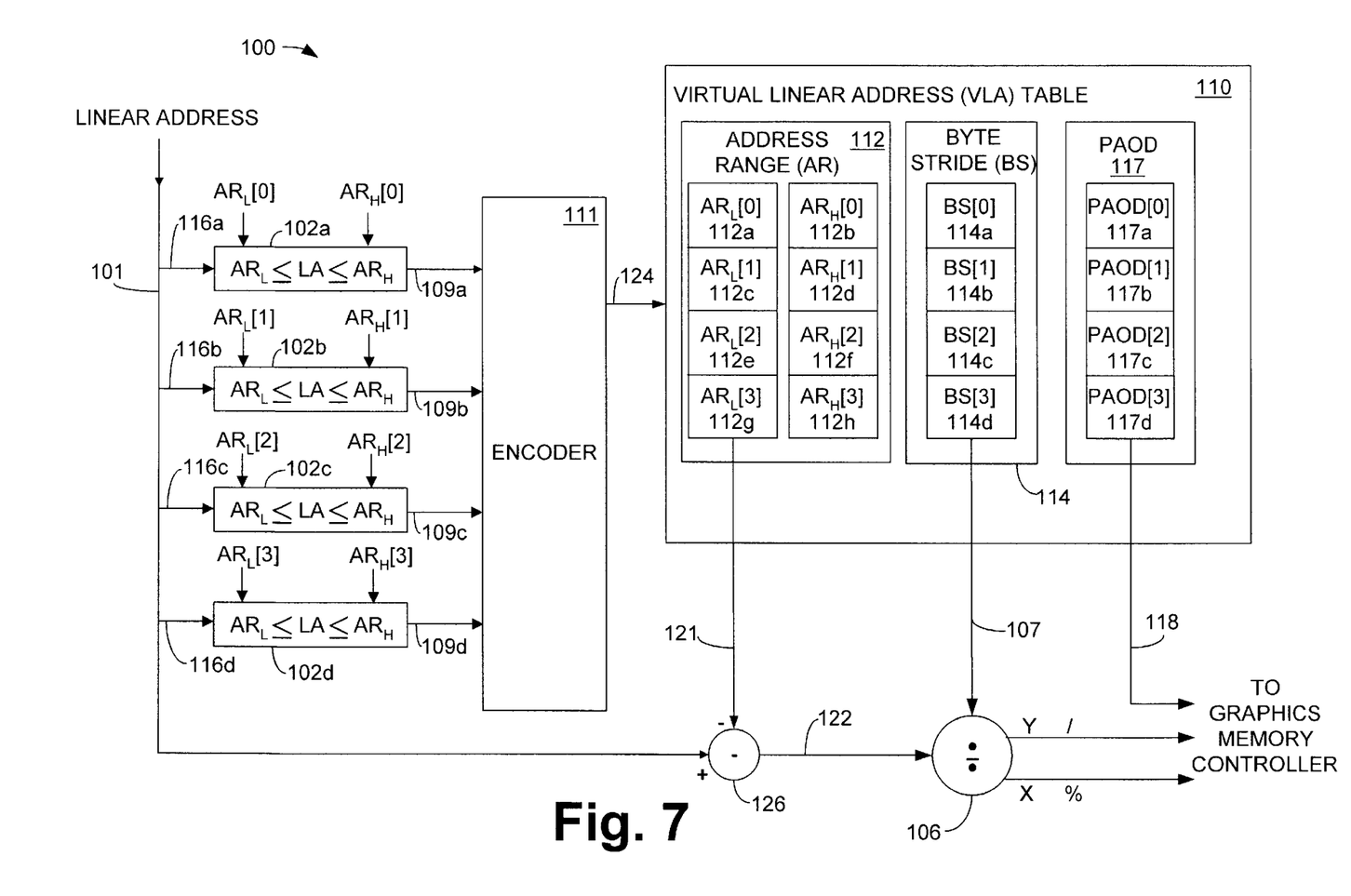
FIG. 7 is a schematic view illustrating the apparatus of the virtual linear frame buffer addressing logic of FIG. 6.

Referring now to FIG. 7, shown is a schematic view illustrating the apparatus of the virtual linear frame buffer addressing logic 100 of FIG. 6.

A linear address is input along bus 101 to an array of comparators 102a through 102d. While four comparators are disclosed herein, each comparator associated with a frame buffer, the array of comparators can be large, depending upon the size of the virtual linear address space 11 and the number of buffers assigned. The comparators are used to determine the address range of the linear address, and are shown in this example as performing a "range compare" function. For example, comparator 102a will receive the linear address from bus 101 on line 116a. If the linear address is within the range of $AR_L[0]$ to $AR_H[0]$, then line 109a will be made active. If the linear address is within the range of $AR_L[1]$ to $AR_H[1]$, then line 109b will be made active an so on. The actual values of the base address will depend upon the configuration of virtual linear address space 11 actually being used. The preceding implementation determines which range of address values the linear address falls within.

Depending upon which line 109a–109d is made active, encoder 111 will provide a table entry select signal on line 124 to virtual linear address (VLA) table 110. Encoder 111 uses the results of the range comparators 102 to select one entry from VLA table 110. The table select entry signal causes one entry to be selected from address range (AR) table 112, byte stride (BS) table 114 and physical address offset descriptor (PAOD) table 117.

Encoder 111 illustratively performs a select function by, for example, determining whether input [0] on line 109a is true (i.e., comparator 102a determines that the particular linear address is within the range of values defined by $AR_L[0]$ and $AR_H[0]$), and if so, the table entry select will select the values associated with [0]. Specifically, AR value 112a ($AR_L[0]$) BS value 114a (BS[0]) and PAOD value 117a (PAOD[0]). If input [1] is true, then the table entry select will select the values associated with [1] and so on.

Illustratively, VLA table 110 contains multiple tables. The address range (AR) table includes entries 112a through 112h. Specifically, in the preferred embodiment, AR 112a and 112b correspond to $AR_L[0]$ and $AR_H[0]$. Given the four comparators in this example, $AR_{L[0]}$ represents the low address in the first range of addresses and $AR_H[0]$ represents the high address in the first range of addresses. Similarly, address range 112c and 112d correspond to $AR_L[1]$ and $AR_H[1]$. $AR_L[1]$ represents the low address in the next range of addresses and $AR_H[1]$ represents the high address in this next range of addresses. The base address of each range is the $AR_L$ value.

VLA table 110 also includes byte stride table 114. Byte stride table 114 illustratively includes byte stride values 114a through 114d, which correspond to byte stride values BS[0] through BS[3]. BS[0] corresponds to address range 0, BS[1] corresponds to address range 1 and so on.

Lastly, VLA table 110 includes physical address offset descriptor (PAOD) table 117, which includes PAOD values 117a through 117d, which correspond to PAOD[0] through PAOD[3]. PAOD[0] corresponds to AR[0] and BS[0] and so on.

When encoder 111 selects a particular table entry, one value is selected from each table within VLA table 110. The base address (or the $AR_L[n]$) corresponding to the address range is output on line 121, the byte stride is output on line 107 and the PAOD is output on line 118.

The four ranges (0–3) represented in each table within VLA table 110 correspond to, in this example, four frame buffers. For example, table values [0] may correspond to display buffer 12 while table values [1] may correspond to Z (depth) buffer 14 and so on. In this way, the virtual linear frame buffer addressing logic 100 can assign a different byte stride to a plurality of buffers within a single section of virtual linear address space 11.

As mentioned previously, the base address represents the lower bound of the address range in which the particular linear address falls. The base address on line 121 is subtracted, in subtractor 126, from the particular linear address on bus 101 resulting in a local linear address on line 122. The local linear address is the linear address with respect to a memory buffer, such as display buffer 12 or composition buffer 16. The local linear address is divided by the byte stride value on line 107. The resultant quotient output is the Y address and the remainder is the X address. This X and Y address along with the physical address offset descriptor is supplied to the graphics memory controller 73, which computes the physical address corresponding to the original linear address.

While the comparators 102a–102d are depicted as a parallel array, other arrangements are possible, so long as the correct address range can be determined from a linear address.

Furthermore, while the preferred embodiment of the VLA table 110 illustrates three tables, i.e., the AR table 112, the BS table 114 and the PAOD table 117, other table configurations are possible.

Figure 8:
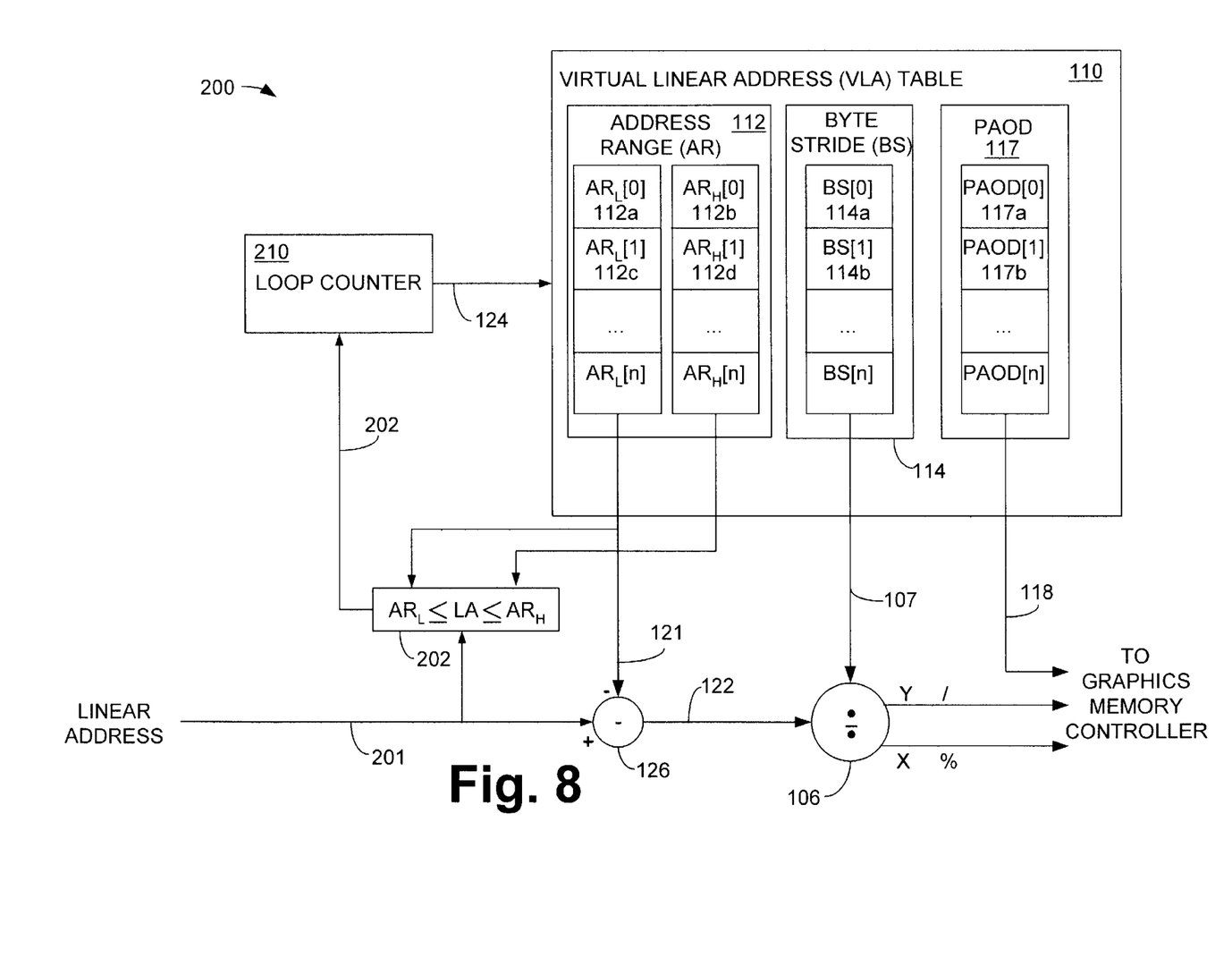
FIG. 8 is a schematic view of an alternate embodiment of the apparatus of the virtual linear frame buffer addressing logic of FIG. 7.

Referring now to FIG. 8 shown is a schematic view of an alternative embodiment 200 of the apparatus of the virtual linear frame buffer addressing logic 100 of FIG. 7. Like numbered items perform the same function and will not be discussed in detail.

Comparators 102a through 102d and encoder 111 are replaced with a single comparator 202 and a loop counter 210. Also, notice that the AR table 112, BS table 114 and PAOD table 117, within VLA table 110 now contain values for "n" buffers. Loop counter 210 cycles through values corresponding to buffers 0 to "n", selecting each entry from VLA table 110 in succession. When comparator 202 detects that the linear address on line 201 is within the address range specified by the current VLA table entry, it signals loop counter 210 to cease counting. At that time, the correct address range is selected and the balance of the computation is performed as described with respect to FIG. 7.

Figure 9:
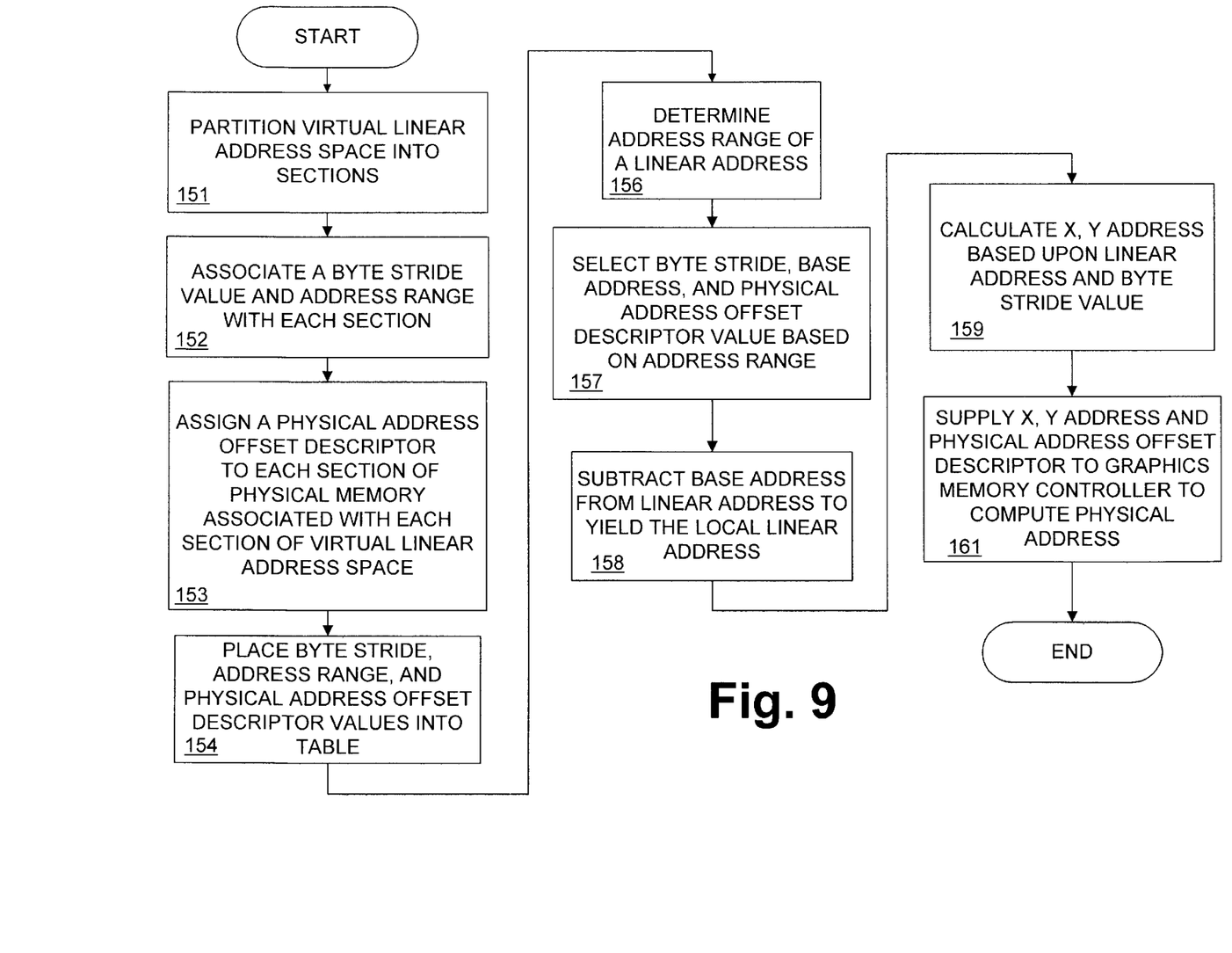
FIG. 9 is a flowchart illustrating the operation of the virtual linear frame buffer addressing logic of FIG. 5.

Referring now to FIG. 9, shown is a flowchart illustrating the operation of the virtual linear frame buffer addressing logic 100 of FIG. 5.

As indicated at block 151, the section of virtual linear address space 11 is partitioned into sections. Each section, reference FIGS. 1 and 5, has a particular byte stride value and address range associated therewith in block 152.

In block 153, a physical address offset descriptor is assigned to each section of physical memory. A section of physical memory is associated with each section of virtual linear memory.

In block 154, the byte stride and address range values, and the physical address offset descriptor, are placed into the virtual linear address table 110. Specifically, the VLA table 110 contains the byte stride, address range values, and physical address offset descriptor values associated with each section of virtual linear address space 11.

As indicated in block 156, the base address range of a particular linear address is determined by taking the linear address supplied by the API 65 (FIG. 6) and operating on the linear address with logic, comparators 102a through 102d, or 202, in this example, to determine the address range that the particular linear address falls within.

In block 157, a particular byte stride value, base address and physical address offset descriptor are selected from VLA table 110 based upon the address range determined by comparators 102 or 202.

In block 158, the base address, i.e., the lower bound of the address range, is subtracted from the linear address supplied by the API to yield the local linear address.

In block 159, the X and Y address is calculated by dividing, using divider 106 in FIGS. 7 and 8 the local linear address, by the byte stride value selected from VLA table 110. The Y address is the quotient output from divider 106, and the X address is the modulus, or remainder.

In block 161, the (X, Y) address and the physical address offset descriptor are used by the graphics memory controller 73 to compute the physical address corresponding to the location in frame buffer memory 74.

It will be obvious to those skilled in the art that many modifications and variations may be made to the preferred embodiments of the present invention, as set forth above, without departing substantially from the principles of the present invention. For example, the high performance pseudo linear frame buffer memory mapping logic can be implemented on an application specific integrated circuit (ASIC). All such modifications and variations are intended to be included herein within the scope of the present invention, as defined in the claims that follow.

What is claimed is:

1. A method for addressing a frame buffer in a linear fashion by converting a linear address to an X, Y address, comprising the steps of:

supplying a linear address to a frame buffer;

partitioning a section of address space into a plurality of sections, each of said plurality of sections having a plurality of values associated therewith, one of said plurality of values having a lower bound known as a base address and a section of physical memory associated therewith;

assigning an offset descriptor to each said section of physical memory;

placing said plurality of values and said offset descriptors into a table;

selecting one of said plurality of values and one of said offset descriptors from said table by comparing said linear address with each section of address space in order to determine an address range associated with said linear address, said address range corresponding to the section of address space to which said linear address is associated;

subtracting said base address from said linear address in order to provide a local linear address;

calculating an X Y location in said physical memory based upon said local linear address and one of said plurality of values; and supplying said X, Y location and said selected offset descriptor to a memory controller wherein said memory controller computes a physical address corresponding to said linear address.

2. The method as defined in claim 1, wherein said section of address space comprises virtual linear memory.

3. An apparatus for addressing a frame buffer in a linear fashion by converting a linear address to an X, Y address, comprising:

a linear address supplied to a frame buffer;

logic configured to determine an address range corresponding to an address of a byte in address space, said address range having a lower bound known as a base address and a section of physical memory associated therewith;

logic configured to associate a byte stride value and said base address with said address range;

said logic configured to associate also configured to associate a physical address offset descriptor with said section of said physical memory;

logic configured to subtract said base address from said linear address in order to supply a local linear address;

first logic configured to calculate an X Y address in said physical memory associated with said linear address based upon said local linear address and said byte stride value; and second logic configured to calculate a physical address based upon said X, Y address in said physical memory and said physical address offset descriptor.

4. The apparatus as defined in claim 3, wherein said byte stride value is selected from a table.

5. The apparatus as defined in claim 3, wherein said logic configured to determine an address range comprises a plurality of comparators.

6. The apparatus as defined in claim 3, wherein said logic configured to determine an address range comprises a comparator and a loop counter.

7. The apparatus as defined in claim 3, wherein said address range is selected from a table.

8. The apparatus as defined in claim 3, wherein said physical address offset descriptor is selected from a table.

9. The apparatus as defined in claim 3, wherein said physical memory comprises virtual linear memory.

10. A computer readable medium having a program for addressing a frame buffer in a linear fashion by converting a linear address to an X, Y address, the program comprising logic configured to:

supply a linear address to a frame buffer;

partition a section of address space into a plurality of sections, each of said plurality of sections having a plurality of values associated therewith, one of said plurality of values having a lower bound known as a base address and a section of physical memory associated therewith;

assign an offset descriptor to each said section of physical memory;

place said plurality of values and one of said offset descriptors into a table;

select one of said plurality of values and one of said offset descriptors from said table by comparing said linear address with each section of address space in order to determine an address range associated with said linear address, said address range corresponding to the section of address space to which said linear address is associated;

subtract said base address from said linear address in order to provide a local linear address;

calculate an X, Y location in said physical memory based upon said local linear address and one of said plurality of values; and supply said X, Y location and said selected offset descriptor to a memory controller, wherein said memory controller computes a physical address corresponding to said linear address.

11. The program of claim 10, wherein said section of address space comprises virtual linear memory.

* * * * *